F. A. PARSONS & J. H. MYERS.
COMBINED ROTARY ENGINE AND PUMP.
APPLICATION FILED JUNE 13, 1910.
1,001,162.
Patented Aug. 22, 1911.
3 SHEETS—SHEET 1.
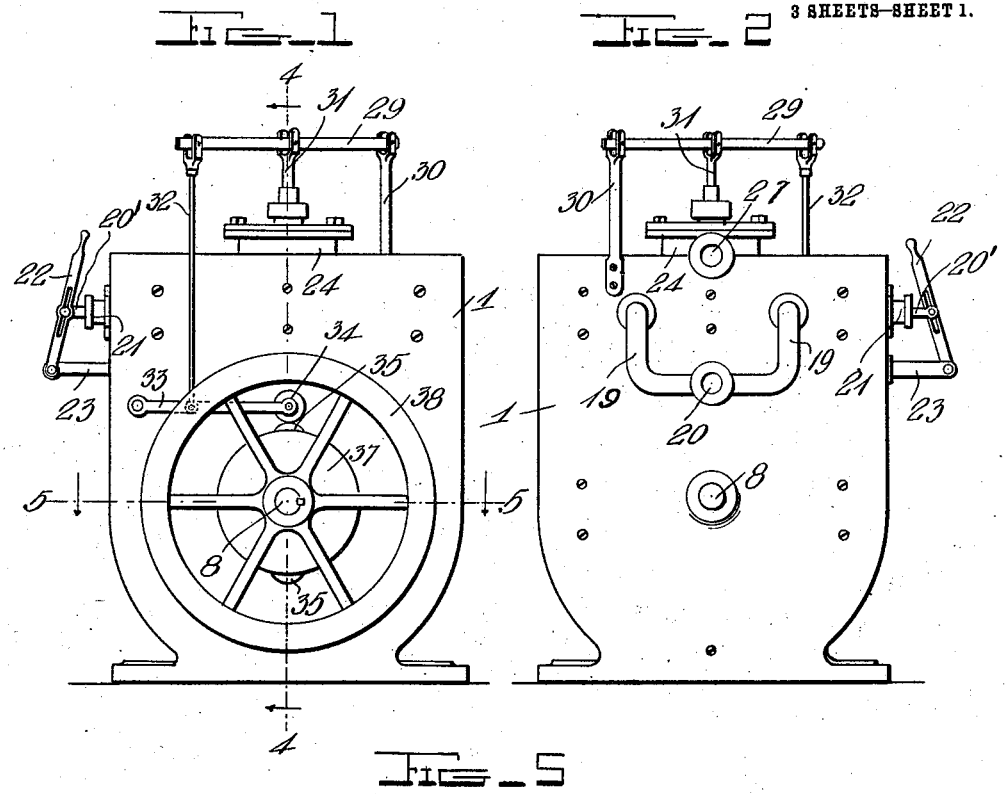
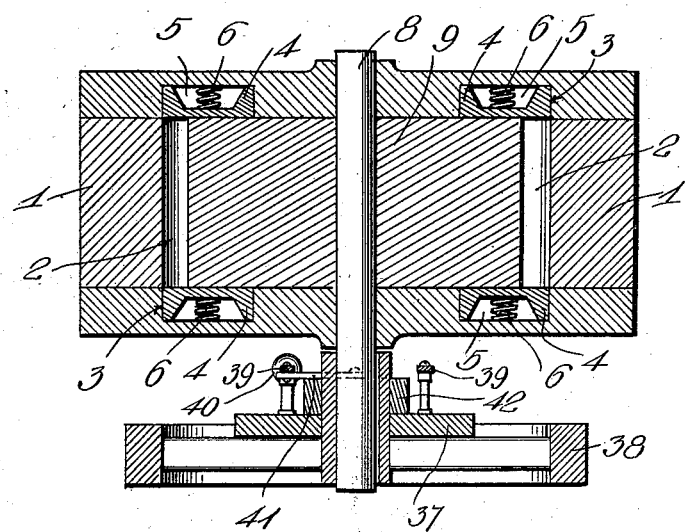

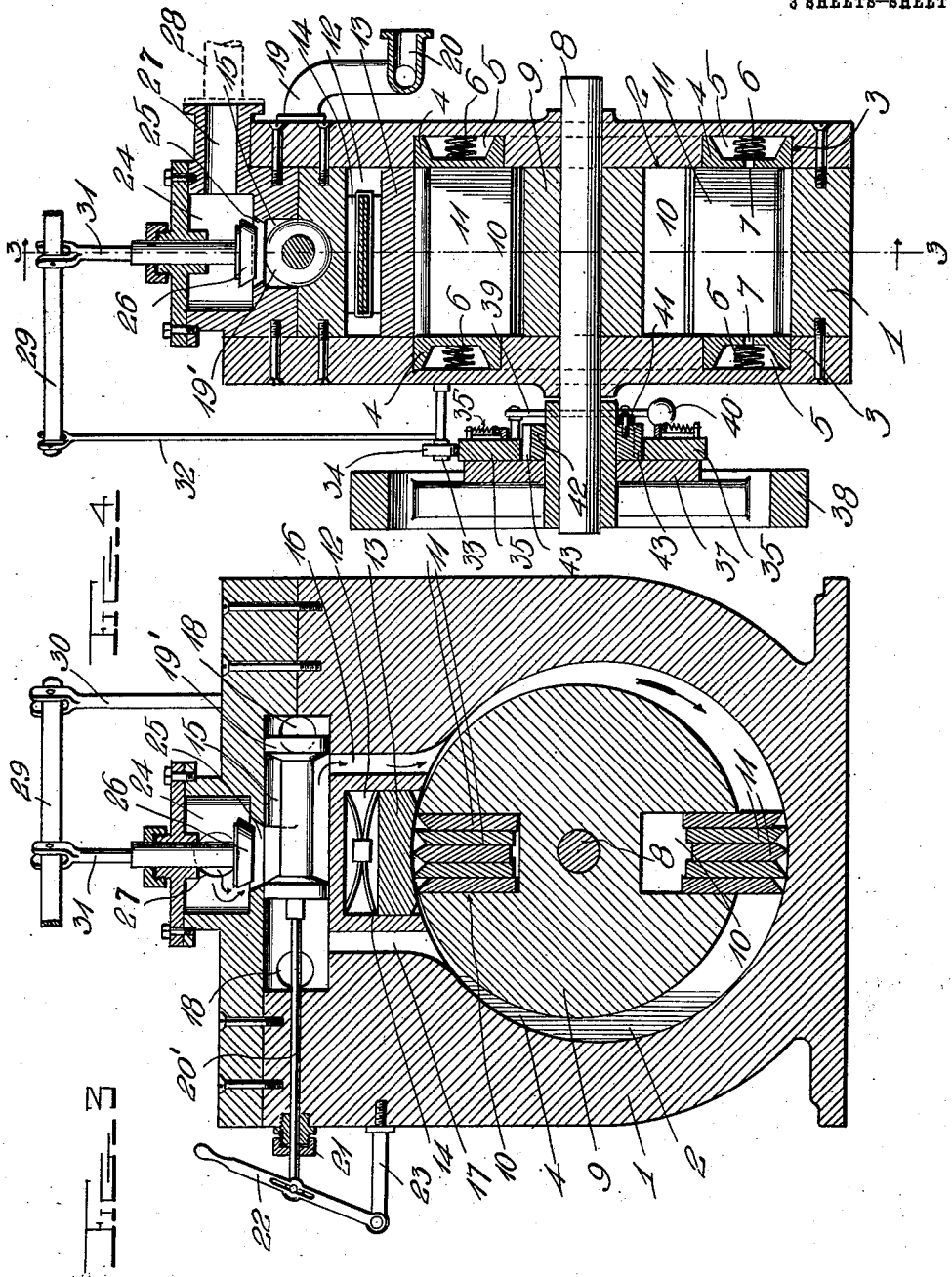

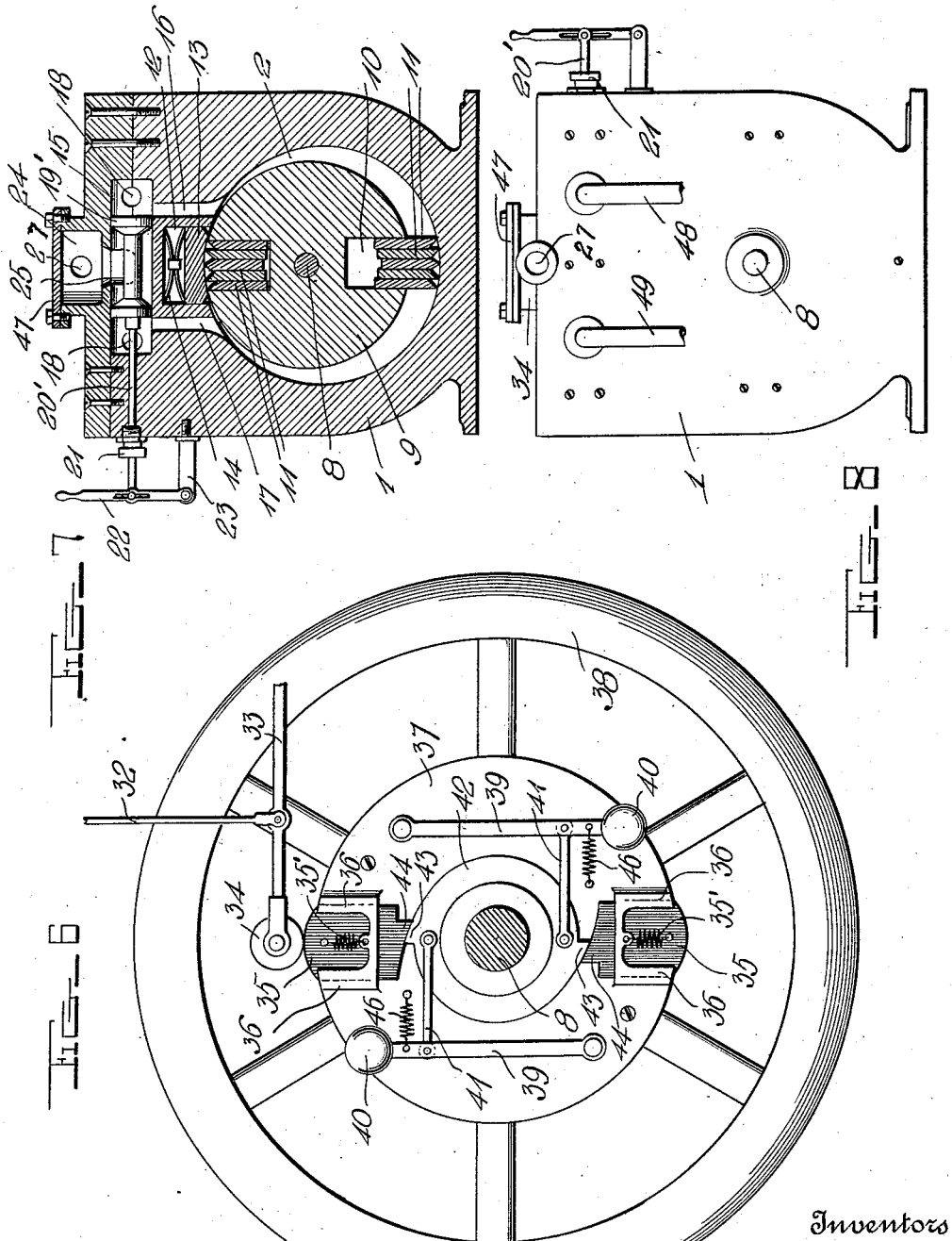

UNITED STATES PATENT OFFICE.

FRED A. PARSONS AND JOHN HOWARD MYERS, OF BINGHAMTON, NEW YORK.

COMBINED ROTARY ENGINE AND PUMP.

1,001,162.  Specification of Letters Patent.  Patented Aug. 22, 1911.

Application filed June 13, 1910. Serial No. 566,552.

*To all whom it may concern:*

Be it known that we, FRED A. PARSONS and JOHN HOWARD MYERS, citizens of the United States, residing at Binghamton, in the county of Broome and State of New York, have invented certain new and useful Improvements in a Combined Rotary Engine and Pump; and we do declare the following to be a full, clear, and exact description of the invention, such as will enable others skilled in the art to which it appertains to make and use the same.

This invention relates to improvements in combined rotary engines and pumps.

One object of the invention is to improve and simplify the construction of rotary engines whereby the steam is used expansively and economically and no dead centers are produced.

Another object is to provide a rotary engine having means whereby the same may be quickly and easily reversed to run in either direction and which may be readily converted into a rotary pump or a water motor.

With the foregoing and other objects in view the invention consists of certain novel features of construction, combination and arrangement of parts as will be hereinafter more fully described and pointed out in the appended claim.

In the accompanying drawings, Figure 1 is a front view of a rotary engine constructed in accordance with the invention. Fig. 2 is a rear view. Fig. 3 is a central vertical sectional view on the line 3—3 of Fig. 4. Fig. 4 is a similar view taken at right angles to Fig. 3 on the line 4—4 of Fig. 1. Fig. 5 is a horizontal sectional view on the line 5—5 of Fig. 1. Fig. 6 is an enlarged front view of the fly wheel and governor. Fig. 7 is a vertical sectional view similar to Fig. 3 showing the parts arranged to form a rotary pump. Fig. 8 is a rear view of the engine as arranged to form a pump.

Referring more particularly to the drawings 1 denotes the engine casing which may be of any suitable shape and which has formed therein a circular piston chamber 2. In the opposite side walls of the chamber 2 are formed annular grooves or channels 3 in which are arranged packing rings 4, said rings having in their outer sides annular recesses 5 and are forced inwardly into steam-tight engagement with the opposite sides of the piston by springs 6 as shown in Fig. 5 of the drawings or by means of steam pressure. When the rings are forced inwardly by steam pressure the steam is admitted to the recessed outer sides of the rings through steam ports or passages 7 formed in the rings as shown in Fig. 4 of the drawings.

Revolubly mounted in the casing 1, eccentrically to the piston chamber 2, is a drive shaft 8 on which, within the chamber 2, is concentrically mounted a cylindrical piston 9, the edge of which at one point has a sliding engagement with the annular wall of the chamber 2. Formed at diametrically opposite points in the piston 9 are rectangular pockets or recesses 10 in which are mounted sliding blades 11 which, as the piston revolves, are thrown outwardly by centrifugal force into steam-tight engagement with the circular wall of the piston chamber 2. The blades 11 are preferably formed of a series of plates or flat blocks having beveled or inclined outer ends which engage the wall of the piston chamber 2, thus forming pockets which are adapted to contain water, the latter forming a steam-tight packing between the ends of the blades and the wall or surface of the piston chamber. In the upper portion of the casing above the point where the piston engages with the wall of the chamber 2 is formed a recess 12 in which is slidably mounted a wear block 13 which is forced into engagement with the adjacent surface of the piston as the latter moves around in the chamber 2 by a spring 14, said block thus compensating for any wear on the piston and affording a tight engagement between itself and the contacting parts of the piston.

In the upper portion of the casing above the recess 12 is arranged a valve chamber 15 which is connected adjacent its opposite ends to the piston chamber 2 by steam inlet and exhaust ports 16 and 17. The ports are arranged on opposite sides of the recess 12 and wear block 13 and open into the chamber 2 on opposite sides of the contacting point between the piston and the wear block 13. In the opposite ends of the valve chamber 15 are formed steam exhaust ports 18 which communicate at the rear side of the casing with the branched end 19 of an exhaust pipe 20. Slidably mounted in the valve chamber 15 is a piston balanced valve 19', the central portion of which is reduced or of less width than the ends whereby a space is formed between said central reduced portion and the inner surface of the steam chamber as shown. The valve 19' is of less length than the chamber 15 and when said valve is moved to one end or the other of said chamber the exhaust port at the end of the chamber to which the valve is shifted will be closed. The valve 19' is provided with an operating stem 20' which projects through the casing and through a suitable stuffing box 21 arranged thereon and is connected at its outer end with an operating lever 22 pivoted at one end to a suitable bracket 23 secured to the adjacent side or end of the engine casing. By means of the lever 22 the valve 19' may be readily shifted to open and close either of the exhaust ports 18.

On the upper end of the engine casing above the chamber 15 is arranged a steam chest 24 which communicates with the chamber 15 through a passage 25 which is adapted to be opened and closed by means of a steam supply valve 26 which is slidably mounted in the steam chest in any suitable manner. The steam chest 24 is connected by a steam port 27 with a suitable steam supply pipe 28. With the parts arranged as shown in Fig. 3 of the drawings, when the valve 26 is open steam will pass through the passage 25 from the steam chest into the valve chamber and from thence will pass around the reduced central portion of the balanced valve 19' and through the inlet port 16 into the live steam side of the piston chamber where said steam will expand against the lower sliding blade 11, thus forcing the piston around in the chamber 2. When the piston is thus forced around the exhaust steam in the exhaust side of the chamber 2 will be forced outwardly by the lower blade 11 through the exhaust port 17 into the valve chamber 15 whence the exhaust steam will be discharged through the exhaust port 18 at this end of the chamber and into the exhaust pipes 19 and 20.
In the operation thus described, the piston is driven in the direction shown by the arrows in Fig. 3 of the drawings. When it is desired to drive the engine in a reverse direction, the valve 19' is shifted to the opposite end of the chamber 15 thereby converting the port 17 into a live steam port and the port 16 into an exhaust steam port so that the live steam will enter the piston chamber 2 on the side of the piston opposite to that described in the first instance, thus forcing the piston around in the direction opposite to the arrows in Fig. 3 as will be readily understood.

In order to intermittently open and close the steam supply valve 26 at the proper time for admitting steam to the engine, we provide an automatic valve operating mechanism comprising a valve opening lever 29 arranged above the engine and pivotally connected at one end with a supporting bracket 30. The lever is connected intermediate its ends to the stem 31 of the valve 26 and it is connected at its outer end by a pivot rod 32 to an operating lever 33 pivotally mounted on the side of the engine casing as shown. On the free end of the lever 33 is pivotally mounted a roller 34 which is adapted to be engaged by the curved projecting outer ends of the tappet blocks 35 which are slidably mounted in suitable guide flanges 36 formed on the inner side of a governor disk or plate 37 secured to the inner side of the fly wheel 38 of the engine. The tappet blocks 35 are arranged at diametrically opposite points on the disk 37 of the fly wheel so that at each complete revolution of the wheel the valve 26 will be opened twice to admit fresh supplies of steam to the piston chamber, said blocks being so arranged with respect to the movement of the fly wheel and piston that steam will be admitted to the piston chamber at the proper time.

In order to automatically control the amount of steam admitted at each opening of the valve, we provide a suitable governor which is shown as and preferably consists of a plate or disk 37 which is bolted or otherwise secured to the spokes of the fly wheel and to which, at diametrically opposite points, are pivotally connected the inner ends of governor levers 39 on the outer ends of which are arranged governor balls or weights 40. The levers 39 are connected adjacent their outer ends by connecting bars 41 to a tappet projecting ring 42 which is loosely mounted on the hub of the fly wheel and is provided at diametrically opposite points with cam lugs 43 which are engaged with similar lugs 44 formed on the inner ends of the tappet blocks 35 as shown. The engaging surfaces of the lugs 43 and 44 are preferably inclined or formed on a suitable curve as shown. The tappet blocks 35 are drawn inwardly and yieldably held in a retracted position against the cam pressure of the cam lugs 43 on the ring 42 by means of coil springs 35' while the governor levers 39 are held in a retracted position against the centrifugal force of the fly wheel by coil springs 46. The tension or pressure of the springs 46 is so regulated that the levers 39 will turn the ring 42 in the proper direction to cause the cam lugs thereon to normally force the tappet blocks outwardly a sufficient distance to cause the valve levers to open the supply valve 26 the proper distance for admitting a sufficient quantity of steam to keep the engine running at the normal or predetermined speed.

If, for any reason, more than the proper amount of steam is admitted to the engine to cause the latter to run at a greater speed than desired the governor balls 40 and levers 39 will fly outwardly by centrifugal force, thus turning the ring 42 in the proper direction for disengaging the cam lugs 43 with the lugs 44 on the tappet blocks 35 allowing the springs 35' of said blocks to retract the latter a sufficient distance to limit the opening of the valve and thus allowing a smaller quantity of steam to enter the engine, thereby reducing the speed thereof. If, on the other hand, the engine should run at less than the desired speed the springs 46 will retract the governor levers 39 and thus turn the ring 42 in the proper direction for further engaging the cam lugs 43 with the lugs on the tappet blocks 35 thus projecting the latter to a greater distance beyond the outer surface of the disk which will cause the valve levers to open the supply valve 26 to a greater distance and admit a larger supply of steam.
When it is desired to operate the engine as a steam pump, the valve 19' is shifted to occupy the space between the ports 16 and 17 thus cutting the latter off from the steam chest and permitting the same to communicate with the opposite ends of the valve chamber 15 and through the same with the exhaust ports 18 of the engine. In this arrangement the steam chest and steam supply pipe are preferably removed and the passage 25 closed by a suitable cover plate 47. The branch exhaust pipe 19 is also removed and one of the exhaust ports 18 has connected thereto a suction pipe 48 while the other exhaust port 18 has connected thereto a discharge pipe 49. When thus arranged a belt is engaged with the fly wheel and the piston thus operated by any suitable motor which will cause the fluid to be pumped through the suction pipe and piston chamber and discharged through the discharge pipe thereby providing an efficient pump which may be used for pumping any kind of liquid, air, gas or any other material which may be drawn through a pump of this character. When the parts are arranged for forming a pump, the device may also be employed as a water motor by connecting the suction pipe 48 with a water main so that the force of the water passing therethrough and through the piston chamber will revolve the piston and pass out through the discharge port and pipe as will be readily understood.

From the foregoing description taken in connection with the accompanying drawings, the construction and operation of the invention will be readily understood without requiring a more extended explanation.

Various changes in the form proportion and the minor details of construction may be resorted to without departing from the principle or sacrificing any of the advantages of the invention as defined in the appended claim.

Having described our invention what is claimed is:

The combination with an engine having a fly wheel, a piston chamber and a piston in said chamber, of a valve to control the admission of steam to the piston chamber, a disk secured concentrically to the fly wheel, guide brackets on one side of said disk, tappet blocks slidably mounted within said brackets, a series of levers connected to the valve, the end of one of said levers being projected into the path of the tappet blocks, a collar loosely mounted on said disk between the tappet blocks and concentric with said disk and having projections bearing against the inner ends of said blocks, springs secured at their inner ends to the guide brackets and at their outer ends to the tappet blocks, and governor arms mounted on the disks and connected to the loosely mounted collar.

In testimony whereof we have hereunto set our hands in presence of two subscribing witnesses.

FRED A. PARSONS.
JOHN HOWARD MYERS.

Witnesses:
W. H. STEERE,
MATTHEW CARY.

---

Copies of this patent may be obtained for five cents each, by addressing the "Commissioner of Patents, Washington, D. C."